United States Patent [19]

Aoyagi

[11] Patent Number: 4,863,228
[45] Date of Patent: Sep. 5, 1989

[54] APPARATUS AND A METHOD OF DEFLECTING LASER CONVERGENT LIGHT

[75] Inventor: Tetsuji Aoyagi, Tokyo, Japan

[73] Assignee: Nakamichi Corporation, Kodaira, Japan

[21] Appl. No.: 154,051

[22] Filed: Feb. 9, 1988

[30] Foreign Application Priority Data

Feb. 10, 1987 [JP] Japan .................................. 62-29241
Feb. 10, 1987 [JP] Japan .................................. 62-29242

[51] Int. Cl.$^4$ ............................................. G02B 26/10
[52] U.S. Cl. ...................................... 350/6.9; 350/6.5
[58] Field of Search ................................. 350/6.5–6.8, 350/486, 6.9, 6.91; 250/236

[56] References Cited

U.S. PATENT DOCUMENTS

| | | | |
|---|---|---|---|
| 3,469,030 | 9/1969 | Priebe | 350/6.8 |
| 3,520,586 | 7/1970 | Bousky | 350/486 |
| 3,667,360 | 6/1972 | Vicik | 350/6.7 |
| 3,873,180 | 3/1975 | Bousky | 350/6.8 |
| 3,890,034 | 6/1975 | Ploeckl | 350/6.8 |
| 4,512,625 | 4/1985 | Brueggemann | 350/6.8 |
| 4,674,826 | 6/1987 | Loy | 350/6.5 |
| 4,681,453 | 7/1987 | Silk | 356/394 |
| 4,759,593 | 7/1988 | Kessler | 350/6.8 |

Primary Examiner—Jon W. Henry
Attorney, Agent, or Firm—Pearne, Gordon, McCoy & Granger

[57] ABSTRACT

An apparatus and a method of deflecting a laser convergent light beam comprising optical reflector means including a reflecting face having a predetermined angle acute relative to a reference face and having an arcuate section formed when viewed in a plane parallel to the reference face and optical path deflecting means to receive the laser light on a predetermined optical path and irradiate the laser light beam in a variable radial direction of a face having a predetermined angle relative to a central axis of the reflecting face at a center of one point on the central axis so that the laser light beam radiates at the desired position of the reflecting face with the length of the optical path for the laser light beam radiating from the optical path deflecting means until it reaches the reference face being always uniform in spite of the radial direction.

12 Claims, 8 Drawing Sheets

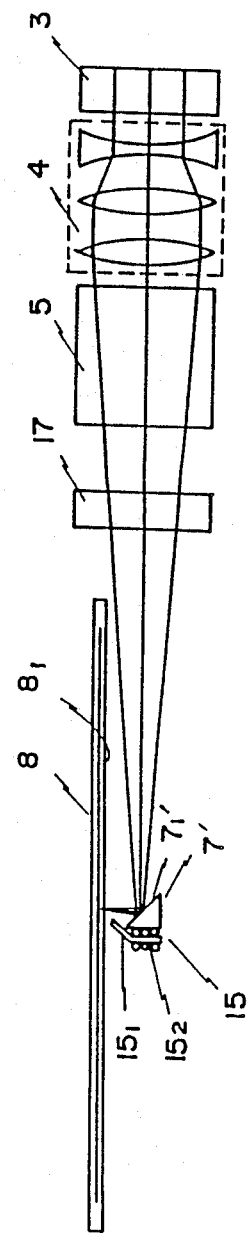
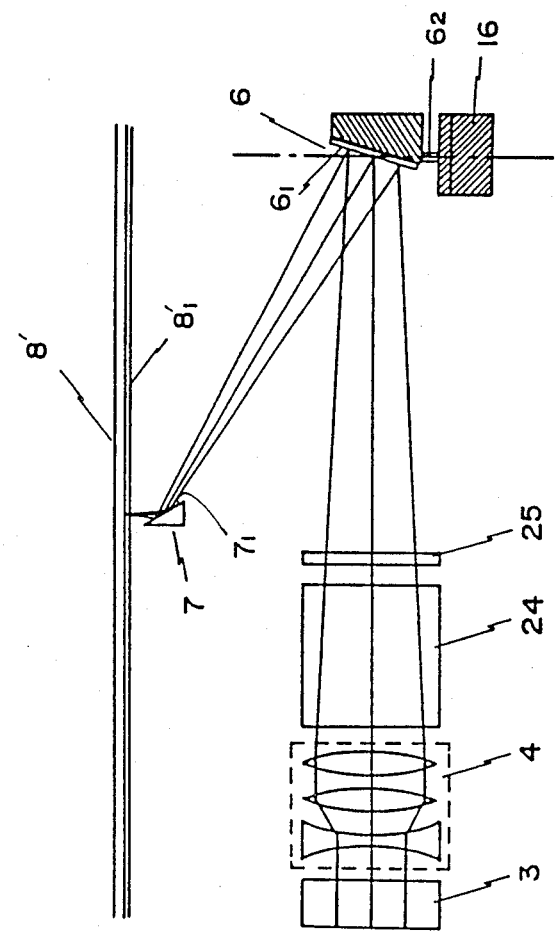
Fig. 2B
Fig. 3B

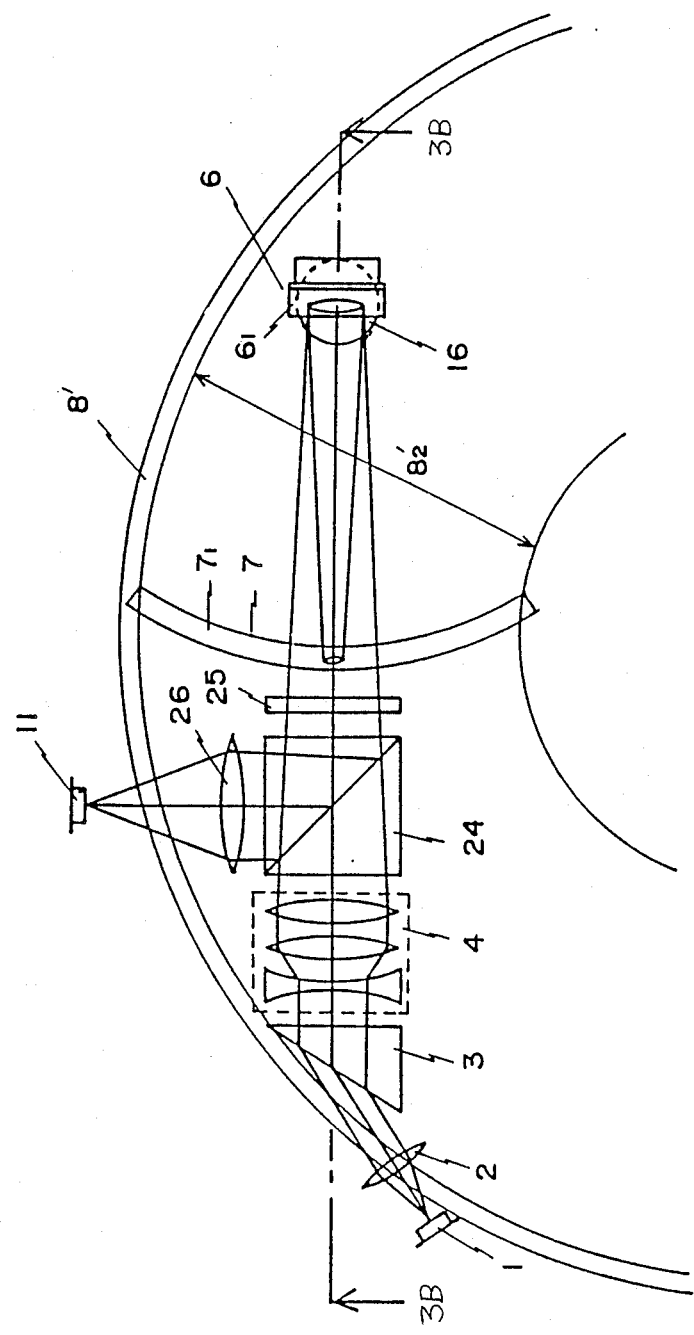

4,863,228

APPARATUS AND A METHOD OF DEFLECTING LASER CONVERGENT LIGHT

BACKGROUND OF THE INVENTION

In a prior art, an apparatus for moving a laser convergent light beam radiating on a track of an optical disk in a direction traversing the track of the optical disk comprises first means to drive a reflector plate or an objective lens within an optical pick-up so as to be operated at a relatively high speed and corresponding to a small moving width and second means to drive the whole optical pick-up at a relatively low speed and corresponding to a large moving width. The first and second means are effectively operated so that the laser convergent light beam is moved in the direction traversing the track of the optical disk. Alternatively, the second means is only used so as to cover the whole movement of the laser convergent light beam. It will be noted that the whole pick-up should be moved in either case.

It will be understood that the optical pick-up is required to be moved in the direction traversing the track of the optical disk in case that the radiation point of the laser convergent light beam on the optical disk should be moved to a desired position. However, it will take substantial time for the optical pick-up to move due to its large inertia mass. Thus, writing signals on the optical disk and/or reading them from the optical disk will be difficult to be accomplished at high speed.

SUMMARY OF THE INVENTION

Accordingly, it is a principal object of the invention to provide an apparatus for deflecting a laser convergent light beam without moving a whole optical pick-up.

It is another object of the invention to provide an apparatus for deflecting a laser convergent light beam for writing signals on an optical disk and/or reading them from the optical disk at higher speed.

It is further object of the invention to provide a method of deflecting a laser convergent light beam without moving a whole optical pick-up.

It is another object of the invention to provide a method for deflecting a laser convergent light beam for writing signals on an optical disk and/or reading them from the optical disk at higher speed.

In accordance with one aspect of the present invention, there is provided an apparatus for deflecting a laser convergent light beam comprising:

optical reflector means including a reflecting face having a predetermined angle acute relative to a reference face and having an arcuate section formed when viewed in a plane parallel to said reference face;

and optical path deflecting means to receive said laser light beam on a predetermined optical path and irradiate said laser light beam in a radial variable direction having a predetermined angle relative to a central axis of said reflecting face with the center at one point on said central axis so that said laser light beam radiates at the desired position of said reflecting face with the length of the optical path from said optical path deflecting means to said reference face through said optical reflector means being always uniform in spite of said variable radial direction.

In accordance with another aspect of the invention, there is provided a method of deflecting a laser convergent light beam comprising the step of deflecting a laser light beam on a predetermined optical path in a radial variable direction having a predetermined angle relative to a central axis of a reflecting face having a predetermined angle acute relative to a reference face and having an arcuate section formed when viewed in a plane parallel to said reference face with the center at one point on the central axis so that said laser light beam radiates at the desired position of said reflecting face with the length of the optical path of the deflected laser light beam to said reference face being always uniform in spite of said variable radial direction.

In accordance with the principle of the invention, since the optical path deflecting means of smaller inertia mass such as a rotary mirror or an optical deflecting element is controlled when the tracking control of the radiation point on the radiation face of the optical disk and the control of movement thereof should be made, writing on and/or reading from the optical disk can be accomplished at higher speed.

Furthermore, since the tracking control can be accomplished without forming any pregrooves on the recording face of the optical disk by providing a predetermined slit-like non-reflecting portion or grooves on the reflecting face of the arcuate mirror, concentric recording tracks can be formed.

BRIEF DESCRIPTION OF THE DRAWINGS

The above and other objects and features of the invention will be apparent from the description of the embodiments taken along with the accompanying drawings in which;

FIG. 2B illustrates the apparatus of FIG. 2A in cross sectional view taken along the line 2B—2B of FIG. 2A;

FIG. 3A illustrates in a plan view an apparatus for deflecting a laser light beam constructed in accordance with further embodiment of the invention;

FIG. 3B illustrates the apparatus of FIG. 3A in cross sectional view taken along the line 3B—3B of FIG. 3A;

DETAILED DESCRIPTION OF THE PREFERRED EMBODIMENTS

Figure 1A:
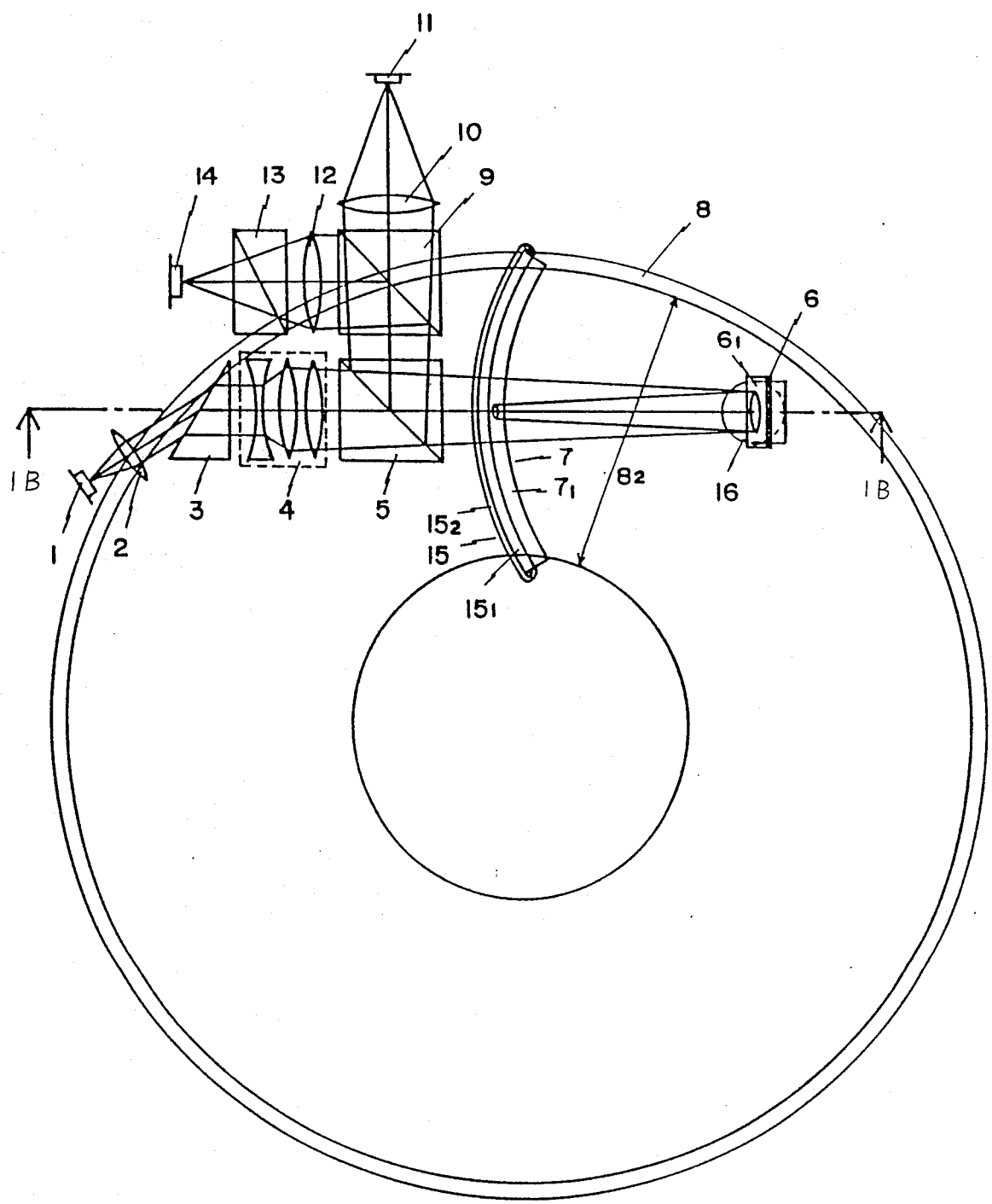
FIG. 1A illustrates in a plan view an apparatus for deflecting a laser light beam constructed in accordance with one embodiment of the invention.
Figure 1B:
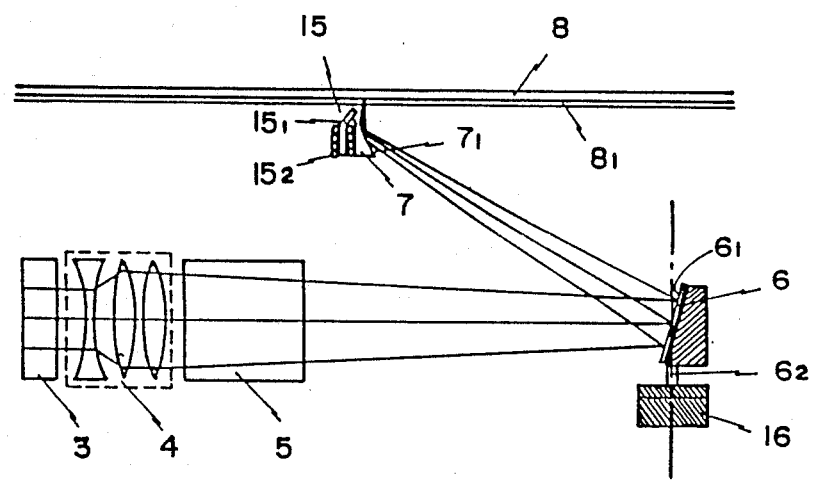
FIG. 1B illustrates the apparatus of FIG. 1A in cross sectional view taken along the line 1B—1B of FIG. 1A.

Referring now to FIGS. 1A and 1B, there is shown an apparatus for deflecting a laser light beam suitably used for an optical disk apparatus of an E-DRAW (erasable direct read after write) system using a magneto-optical disk.

As shown in FIG. 1A, a laser light beam radiating from a semiconductor laser 1 is made collimated light by a collimator lens 2 and thereafter formed into a light beam having a cross section of circle by a forming prism 3. The thus formed laser light beam is made a convergent beam by a converging lens 4 including a concave lens and convex lenses and passes through a half mirror 5 to reach a rotary mirror 6. The rotary mirror 6 has a rotary shaft $6_2$ rotationaly driven by a drive motor 16. The rotary shaft $6_2$ of the rotary mirror 6 has a central axis perpendicularly disposed relative to a radiation face $8_1$ of a magneto-optical disk 8 and coincident with a the center of an optical spot on a plane reflecting face $6_1$. Thus, it will be noted that the plane reflecting face $6_1$ of the rotary mirror 6 rotates while it is maintained at a predetermined angle relative to the radiation face $8_1$ of the magneto-optical disk 8. This causes the convergent laser light beam reflected by the reflecting face $6_1$ to reach an arcuate mirror 7 while it is reflected in a variable radial direction from the center of the optical spot as the rotary mirror 6 rotates.

The convergent laser light beam reflected by the arcuate mirror 7 reaches the radiation face $8_1$ of the magneto-optical disk 8 having pregrooves.

The reflecting face $7_1$ of the arcuate mirror 7 has an arc in a conic section circle centered on the central axis of rotation of the rotary mirror 6 and is so disposed that the light beam traverses a recording area $8_2$ of the magneto-optical disk 8 while it is maintained at a predetermined angle relative to the radiation or reference face $8_1$ of the magneto-optical disk 8. It should be noted that the thus combined rotary mirror 6 and arcuate mirror 7 cause the length of the optical path for the convergent laser light beam from the converging lens 4 until it reaches the radiation face $8_1$ of the magneto-optical disk 8 to be always uniform in spite of the rotary variable position of the rotary mirror 6. Thus, by adjusting the converging lens 4 in one rotary position of the rotary mirror 6 so that the radiation face $8_1$ of the magneto-optical disk 8 is positioned at a focus of the convergent laser light beam, the radiation point of the convergent laser light beam in accordance with the rotation of the rotary mirror 6 moves along the arc of the mirror 7 within the recording area $8_2$ of the magneto-optical disk 8 while the focus position is always maintained at the radiation face $8_1$ of the magneto-optical disk 8.

It will be noted that the angle of the reflecting faces of the rotary mirror 6 and the arcuate mirror 7 relative to the radiation face $8_1$ of the magneto-optical disk 8 is determined by setting the optical path for the convergent laser light beam while it is so set that the convergent laser light beam is perpendicularly irradiated on the radiation face $8_1$ of the magneto-optical disk 8.

The returned reflection light beam reflected by the radiation face $8_1$ of the magneto-optical disk 8 is reflected by the arcuate mirror 7 and the rotary mirror 6, respectively, and reaches the half mirror 5. The returned reflection light beam reflected by the half mirror 5 is divided by a half mirror 9 into two divided light beams. One of the divided light beams passes through a converging lens 10 and reaches a two-dividing photodetector 11 for detecting a tracking error signal while the other divided light beam passes through a converging lens 12 and an analyzer 13 and reaches a recorded signal detector 14.

A biasing magnet 15 comprising a yoke $15_1$ and a coil $15_2$ wound on the yoke $15_1$ is provided along the arcuate mirror 7 around the radiation point moving on the radiation face $8_1$ of the magneto-optical disk 8 in accordance with the rotation of the rotary mirror 6 for producing a biasing magnetic field when the signal is recorded or erased. The biasing magnet 15 produces the biasing magnetic field around the radiation point by flowing a DC current through the coil $15_2$ in a predetermined direction.

Figure 1C:
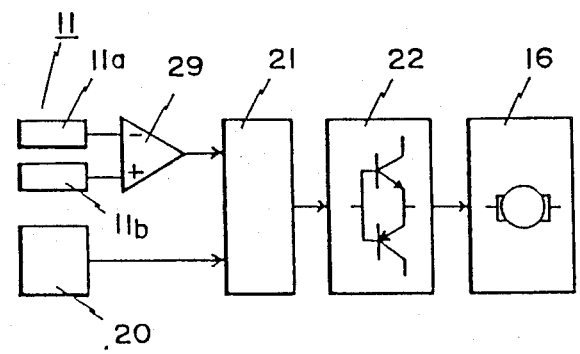
FIG. 1C is a block diagram of motor control means used for the apparatus of FIG. 1A.

Motor control means for the drive motor 16 is shown in FIG. 1C. A subtracter 29 receives light quantity signals from respective detectors $11a$ and $11b$ of the two-dividing photodetector 11 and produces the tracking error signal in accordance with the position information of the radiation point relative to the pregrooves in the magneto-optical disk by taking the difference between the light quantity signals. A motor control circuit 21 receives the tracking error signal and supplies a drive motor control signal to a motor driver 22 to drive the drive motor 16 so that the radiation point is set at the predetermined position of the pregrooves. Thus, it will be noted that the system controls the tracking of the radiation point when the signal is normally recorded and/or reproduced.

In case that the track should be moved so that the radiation point on the magneto-optical disk 8 has access to the desired radiation position, an instruction signal is sent from a track movement instruction circuit 20. The motor control circuit 21 interrupts the tracking control when the instruction signal is received and sends a control signal to the motor driver 22 so that the drive motor 16 is driven in accordance with the instruction signal.

The track movement instruction circuit 20 outputs instruction signals in accordance with various informations. For example, the instruction circuit 20 selects the position information recorded on the magneto-optical disk 8 from the reproduced signals detected by the recorded signal detector 14 to produce the instruction signal so that the position information is consistent with the position designated by an operator. Otherwise, it may be provided with a potentiometer to detect the rotary position of the rotary mirror 6 to produce the instruction signal so that an output signal from the potentiometer relating to the radial position of the radiation point on the magneto-optical disk 8 is consistent with the radial position designated by the operator, or to produce a track jumping signal as the magneto-optical disk rotates each revolution in case that the magneto-optical disk has pregrooves concentrically formed. The form of the instruction circuit 20 may be selected in accordance with the application of the magneto-optical disk. The description of the details will be omitted because they do not directly relate to the invention.

In case that the signals are to be recorded, the DC current is supplied from current supply means, not shown, to the coil $15_2$ of the biasing magnet 15 for producing the biasing magnetic field around the radiation point of the magneto-optical disk 8. While this condition is maintained, the laser light beam from the laser 1 is modulated by the signal to be recorded to be converted into one having a predetermined level in accordance with the signal to be recorded.

In case that the signal is to be reproduced from the magneto-optical disk 8, the laser light beam is converted into one having a predetermined reproducing level and the returned reflected light passing through the analyzer 13 in accordance with the signal recorded on the magneto-optical disk is detected by the recorded signal detector 14.

The recording and reproducing operations using the magneto-optical disk are made using the record of Curie point on recording and the Kerr effect on reproducing, but the description of the details on their principles, the optimum laser output, the method of modulation and the optimum biasing magnetic field will be omitted.

Figure 2C:
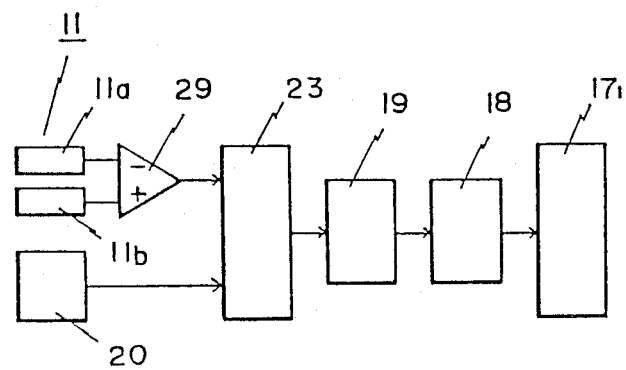
FIG. 2C is a block diagram of drive control means for optical deflecting element used for the apparatus of FIG. 2A.
Figure 2A:
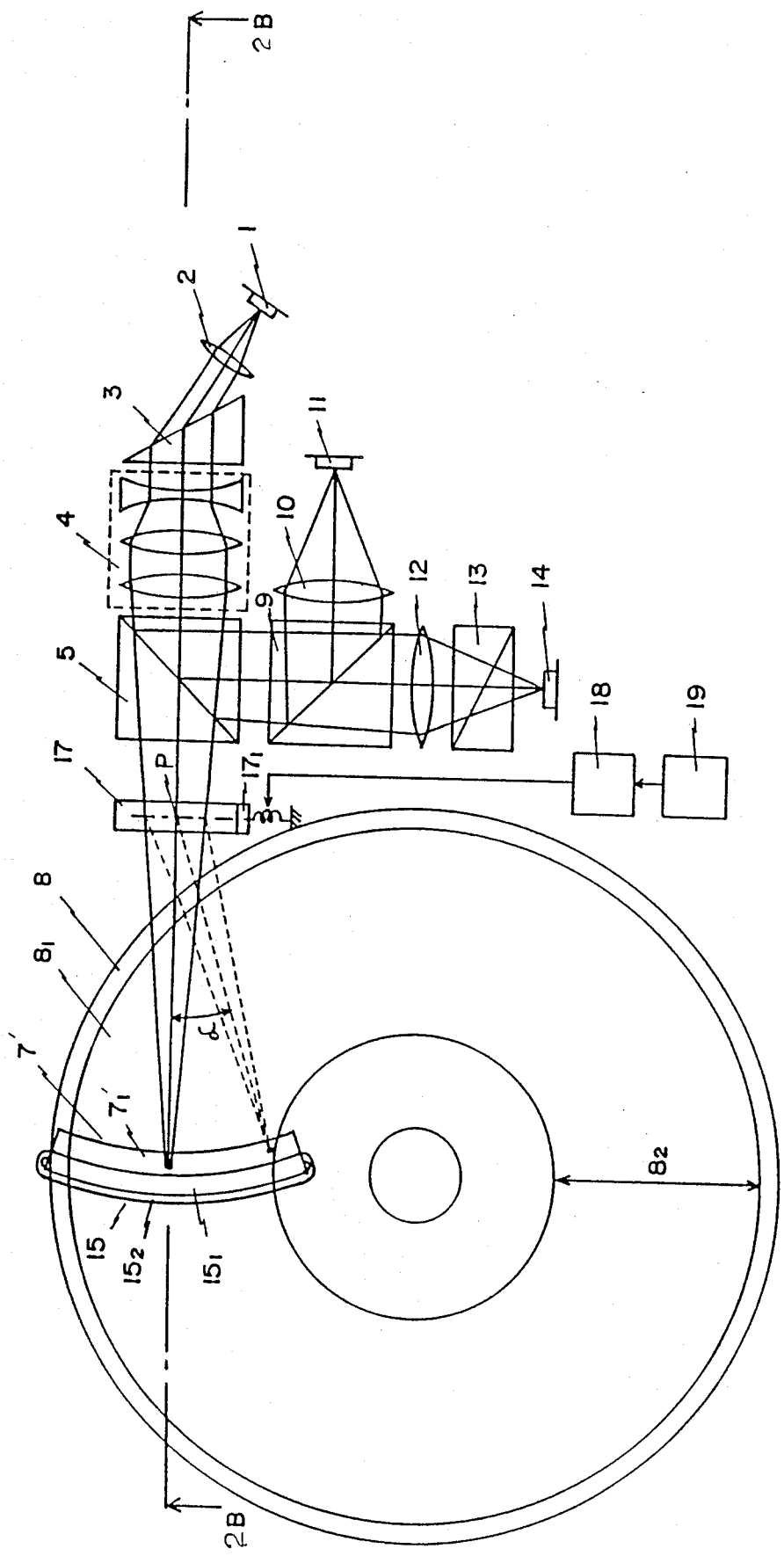
FIG. 2A illustrates in a plan view an apparatus for deflecting a laser light beam constructed in accordance with another embodiment of the invention.

FIGS. 2A and 2B show another embodiment of the invention and the same reference numerals designate the same components.

As shown in FIG. 2A, the laser light beam radiating from the semiconductor laser 1 is made collimated light by the collimator lens 2 and thereafter formed into a light beam having a cross section of a circle by the forming prism 3. The thus formed laser light beam is made convergent light by the converging lens 4 including a concave lens and convex lenses and passes through the half mirror 5 to reach an optical deflecting element 17. The laser light beam having an advancing direction changed by the optical deflecting element 17 in a desired direction is reflected by the arcuate mirror 7' and reaches the reflecting face $8_1$ of the magneto-optical disk 8 having the pregrooves. The returned light beam reflected by the reflecting face $8_1$ of the magneto-optical disk 8 reaches the half mirror 5 through the same optical path and thereafter is treated in the same manner as described with respect to the embodiment of FIGS. 1A and 1B.

The optical deflecting element 17 has crystal of high photoelasticity such as single crystal of $PbMO_4$ and $TiO_2$, for example, and serves to deflect the light beam in accordance with the frequency f of supersonic vibration applied thereto.

The arcuate mirror 7' has the reflecting face $7_1'$ having a predetermined angle relative to the radiation face $8_1$ of the magneto-optical disk 8 in the same manner as described with reference to the embodiment of FIGS. 1A and 1B, but has the center of arc disposed at the central point P of the laser optical path of the optical deflecting element 17.

It should be noted that the thus combined optical deflecting element 17 and arcuate mirror 7' cause the length of the optical path for the convergent laser light beam from the converging lens 4 until it reaches the radiation face $8_1$ of the magneto-optical disk 8 to be always uniform in spite of the deflecting variable angle α of the optical deflecting element 17. Thus, by adjusting the converging lens 4 in one deflecting angle of the optical deflecting element 17 so that the radiation face $8_1$ of the magneto-optical disk 8 is positioned at a focus of the convergent laser light beam, the radiation point of the convergent laser light in accordance with the deflecting angle of the optical deflecting element 17 moves along the arc of the arcuate mirror 7' within the recording area $8_2$ of the magneto-optical disk 8 while the focus position is always maintained at the radiation face $8_1$ of the magneto-optical disk 8.

It will be noted that the angle of the reflecting face of the arcuate mirror 7' relative to the radiation face $8_1$ of the magneto-optical disk 8 is determined by setting the optical path for the convergent laser light beam while it is so set that the convergent laser light beam is perpendicularly irradiated on the radiation face $8_1$ of the magneto-optical disk 8.

The description of the biasing magnet 15 disposed around the arcuate mirror 7' will be omitted because it has the same construction as that of the embodiment of FIGS. 1A and 1B.

Drive control means for the optical deflecting element 17 is shown in FIG. 2C. In FIG. 2C, a reference numeral 19 designates a drive voltage generator, a reference numeral 18 designates a deflecting signal generator, a reference numeral 17, designates an electro-acoustic converter for driving the optical deflecting element 17 by supersonic vibration and a reference numeral 23 designates a light beam deflecting element control circuit.

The optical deflecting element control circuit 23 receives the tracking error signal from the subtracter 29 receiving light quantity signals from the respective detectors 11a and 11b of the two-dividing photodetector 11 and supplies the control signal to the drive voltage generator 19 so that the radiation point is controlled at the predetermined position of the pregrooves in the magneto-optical disk 8. The drive voltage generator 19 produces the voltage signal in accordance with the input control signal to change the frequency of the output signal from the deflecting signal generator 18. The deflecting signal generator 18 changes the frequency of the supersonic vibration of the electro-acoustic converter $17_1$ to control the deflecting angle of the light beam by the optical deflecting element 17. It will be noted that the system can accomplish the tracking control of the radiation point.

Since the operation of the apparatus of FIGS. 2A and 2B when the signal is to be recorded or reproduced and the operation of moving the track of the radiation point by the track movement instruction circuit 20 are identical to those of the embodiment of FIGS. 1A and 1B, the description of them will be omitted.

FIGS. 3A and 3B show further embodiment of the invention which is applied to an apparatus of a DRAW system or to an apparatus for magneto-optical disk exclusively used for reproduction. The same reference numerals designate the same components.

As shown in FIG. 3A, the laser light beam radiating from the semiconductor laser 1 is made collimated light by the collimator lens 2 and thereafter formed into a beam having a cross section of a circle by the forming prism 3. The thus formed laser light beam is made convergent light by the converging lens 4 including a concave lens and convex lenses and passes through a polarizing beam splitter 24 and a λ/4 plate 25 to reach the rotary mirror 6. The convergent laser light beam reflected by the reflecting face $6_1$ of the rotary mirror 6 is reflected by the arcuate mirror 7 and then reaches the reflecting face $8_1'$ of the optical disk 8'.

Since the construction of the arcuate mirror 7, the rotary mirror 6 and drive means for the rotary mirror 6 are identical to that of the embodiment of FIGS. 1A and 1B, the description of them will be omitted.

The returned light beam reflected by the reflecting face $8_1'$ of the optical disk 8' is reflected by the polarizing beam splitter 24 on the same optical path and then passes through a converging lens 26 to reach a two-dividing photodetector 11.

Respective light quantity signals from the respective detectors 11a and 11b of the two-dividing photodetector 11 are added to each other to provide the recorded signal information on the optical disk while one of the light quantity signals is subtracted from the other signal to provide the tracking error signal based on the position information of the radiation point relative to the pregrooves or pits formed on the optical disk.

The tracking control by the tracking error signal can be accomplished by the motor control means as shown in FIG. 1C while the description of the detection of the recorded signal position information will be omitted.

In case that the signals are to be recorded on the optical disk of a DRAW system, this can be accomplished by modulating the laser light beam from the laser 1 into one having a predetermined level. In case that the signal is to be reproduced from the magneto-optical disk 8', this can be accomplished by converting the laser light beam from the laser 1 into one having a predetermined reproducing level and detecting by the two-dividing photodetector 11 the returned reflected light beam varying in accordance with the recorded signal on the optical disk.

Since the operation of the apparatus of FIGS. 3A and 3B when the signal is to be recorded on or reproduced from the optical disk, the method of controlling the laser and the method of detecting the tracking error signal are known and do not directly relate to this invention, the description of them will be omitted.

Figure 4:
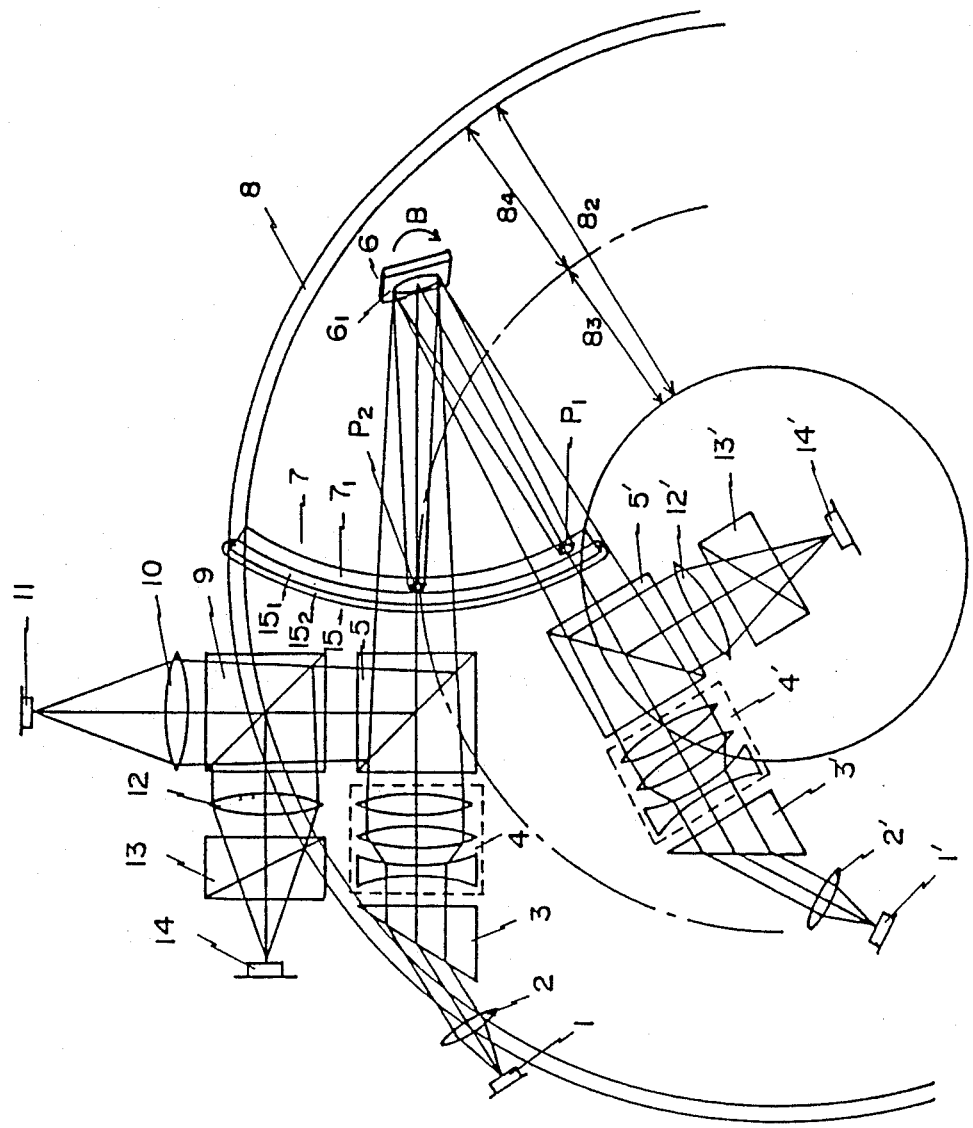
FIG. 4 illustrates in a plan view an apparatus for deflecting a laser light beam constructed in accordance with a further embodiment of the invention.

FIG. 4 shows a further embodiment of the invention which is applied to an apparatus of an E-DRAW system as identical to that of the embodiment of FIGS. 1A and 1B, except that two lasers are used to record and reproduce the signals. The same reference numerals designate the same components.

Since the components of FIG. 4 having the reference numerals 1 through 14 attached have the construction identical to that of the components of FIG. 1A and 1B, the description of them will be omitted, but the radiation point of the laser light beam from the semiconductor laser 1 at the reference rotary position of the rotary mirror 6 is so set that it is positioned at the innermost track within the recording area $8_2$ of the magneto-optical disk 8.

In FIG. 4, there are provided two laser light incident paths having two laser light beams reflected by the plane reflecting face $6_1$ of the rotary mirror 6 at the angle of the optical path relative to the reference face and in the incident directions different from each other.

More particularly, there is also irradiated the laser light beam from the semiconductor laser 1' which is made collimated light by the collimator lens 2' and thereafter formed into a beam having a cross section of a circle by the forming prism 3'. The thus formed laser light beam is made convergent light by the converging lens 4' including a concave lens and convex lenses and passes through the half mirror 5' to reach the rotary mirror 6. The convergent laser light beam reflected by the reflecting face 61 of the rotary mirror 6 is reflected by the arcuate mirror 7 and then reaches the reflecting face $8_1$ of the magneto-optical disk 8. The returned light beam reflected by the reflecting face $8_1$ of the magneto-optical disk 8 is reflected by the arcuate mirror 7 and the rotary mirror 6, respectively, to reach the half mirror 5'. The returned light beam reflected by the half mirror 5' passes through the converging lens 12' and the analyzer 13' to reach the recorded signal detector 14'.

The radiation point of the laser light beam by the semiconductor laser 1' is so set as to be positioned at the center track within the recording area $8_2$ of the magneto-optical disk 8 when the rotary mirror 6 is positioned at the reference rotary position. Accordingly, when the rotary mirror 6 is rotated from the reference rotary position in a direction as indicated by an arrow B of FIG. 4 and therefore the radiation point $P_1$ of the semiconductor laser 1 is moved within the recording area half $8_3$ corresponding to the inner half of the recording area $8_2$, the radiation point $P_2$ of the semiconductor laser 1' is moved within the recording half $8_4$ corresponding to the outer half of the recording area $8_2$ while the equal distance between the radiation points $P_1$ and $P_2$ is maintained.

The rotary mirror 6 may be driven by the drive means including the drive motor 16 and the motor control circuit as shown in FIG. 1C.

As the two semiconductor lasers 1 and 1' are used as shown in FIG. 4, it will be noted that the moving distance of the radiation point can be half that of the single semiconductor laser system and that the signals can be recorded and reproduced in parallel. Thus, it will be understood that the time required for signal recordal and reproduction and access can be reduced to half.

A method of controlling the tracking which can be easily accomplished without forming any pregrooves on the radiation face of the magneto-optical disk by using the apparatus of the invention will be described with reference to FIGS. 5A, 5B, 6A and 6B.

This method will be accomplished by forming slit-like reflecting portions and non-reflecting portions corresponding to the desired radial recording position of the magneto-optical disk on the reflecting face $7_1$ of the arcuate mirror 7 in the apparatus of FIGS. 1A and 1B.

Figure 5A:
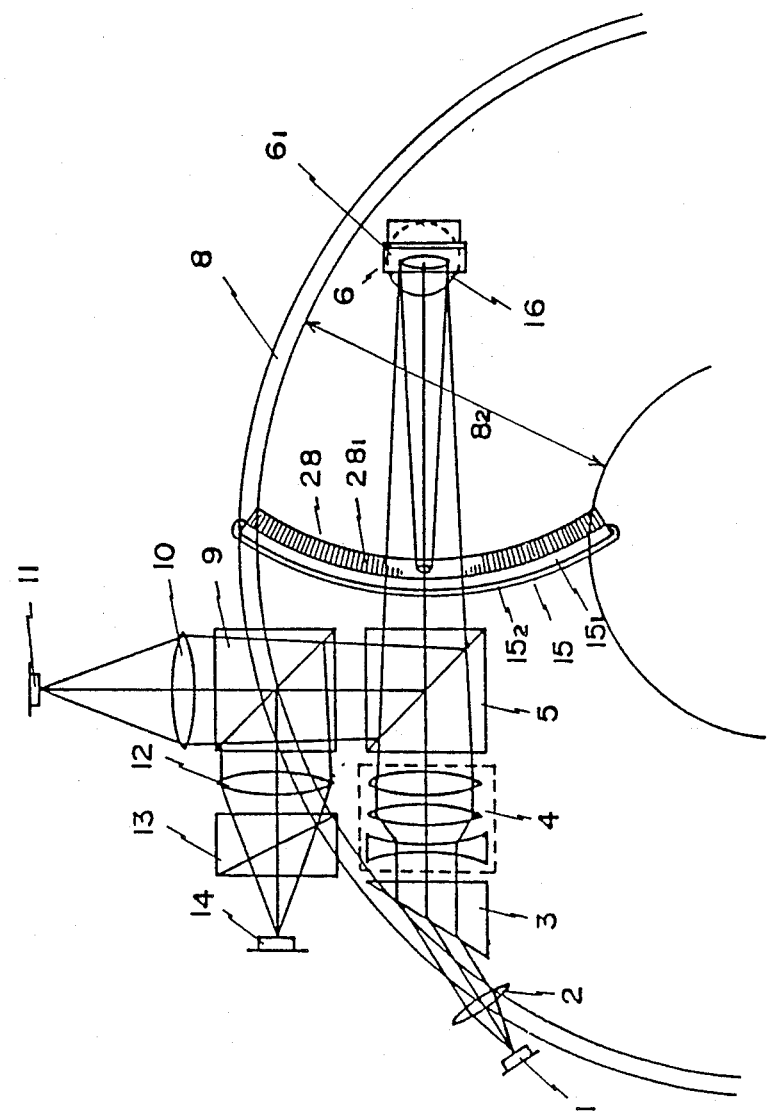
FIG. 5A illustrates in a plan view the optical disk apparatus of FIG. 1A operated for tracking control.
Figure 5B:
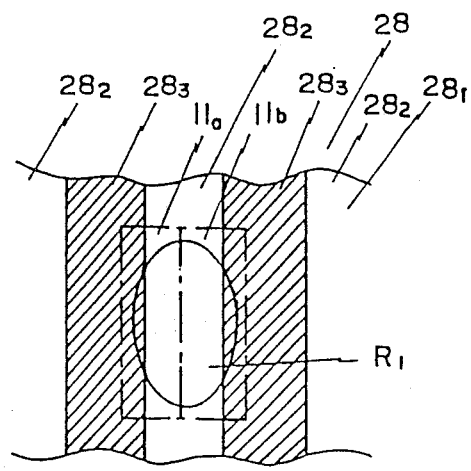
FIG. 5B illustrates a range within which light quantity is detected by a photodetector in an arcuate mirror of the apparatus of FIG. 5A.

FIG. 5A shows the optical disk apparatus having an arcuate mirror 28 including the reflecting and non-reflecting portions formed therein while FIG. 5B shows the reflecting and non-reflecting portions $28_2$ and $28_3$ formed in the reflecting face $28_1$ of the arcuate mirror 28, the reflecting point $R_1$ of the convergent laser light beam and the imaginary light quantity detection range on the reflecting face $28_1$ of the arcuate mirror 28 by the detectors 11a and 11b of the two-dividing photo-detector 11.

The reflecting point $R_1$ of the convergent laser light beam can be so controlled as to be positioned at the center of the the reflecting portion $28_2$ by controlling the rotary mirror 6 based on the light quantities detected by the respective detectors 11a and 11b.

Figure 6A:
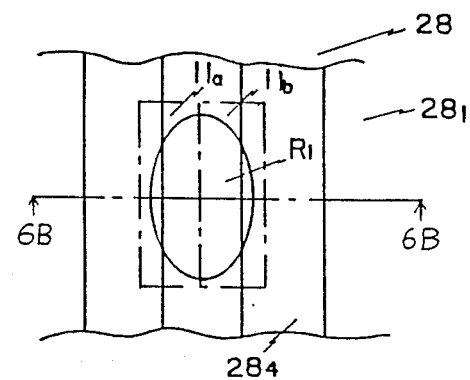
FIG. 6A illustrates a range within which light quantity is detected by a photodetector in another arcuate mirror.
Figure 6B:
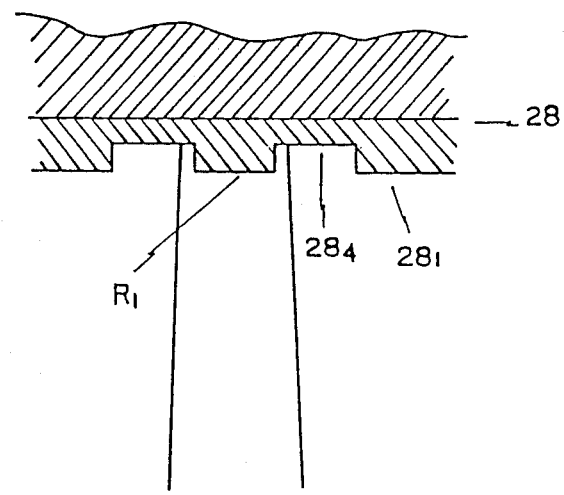
FIG. 6B is a cross sectional view of FIG. 6A taken along the line 6B—6B thereof.

FIGS. 6A and 6B illustrates an embodiment of the method in which grooves $28_4$ are formed in place of the non-reflecting portions in the reflecting face $28_1$ of the arcuate mirror 28. FIGS. 6A and 6B show the grooves $28_4$ formed in the reflecting face $28_1$ of the arcuate mirror 28, the reflecting point $R_1$ of the convergent laser light beam and the imaginary light quantity detection range on the reflecting face $28_1$ of the arcuate mirror 28 by the detectors 11a and 11b of the two-dividing photo-detector 11.

The depth of the formed grooves $28_4$ is so set that the difference between the length of the optical path of the laser reflected by the grooves and that of the laser reflected by the lands between the grooves corresponds to ½ wavelength of the laser light beam and determined by a wavelength of the laser light beam and an incident angle of the laser light beam relative to the reflecting face $28_1$ of the arcuate mirror 28.

The reflecting point $R_1$ of the convergent laser light beam can be so controlled as to be positioned between the grooves by detecting by the two-dividing detectors 11a and 11b the laser light beam reflected by the reflecting face $28_1$ of the arcuate mirror 28 having the grooves formed therein and controlling the rotary mirror 6 based on the thus detected light quantities. It should be noted that the recording tracks formed by using the arcuate mirror 28 will be in the concentric form.

Although some preferred embodiments of the invention have been illustrated and described with reference to the accompanying drawings, it will be understood by those skilled in the art that they are by way of example, and that various changes and modifications may be made without departing from the spirit and scope of the invention. For example, the rotary mirror 6 may be driven by a piezo-electric element in place of the drive motor 16 which may be controlled by an appropriate control circuit. Furthermore, if the focus of the laser light beam should be controlled, it may be accomplished by using an optical system of astigmatism or critical angular method, a four-dividing photodetector and a focus control circuit to control driving the collecting lens 4. Thus, it will be understood that this invention is intended to be defined only by the appended claims.

What is claimed is:

1. An apparatus for deflecting a laser convergent light beam comprising:
   optical reflector means including a reflecting face on a portion of a cone, having a predetermined acute angle relative to a reference face and having an arcuate section formed when viewed in a plane parallel to said reference face;
   and optical path deflecting means to receive said laser light beam on a predetermined optical path and to irradiate said laser light beam onto said optical reflector means in variable radial directions each having a predetermined angle relative to a central axis of the cone of said reflecting face with the center of said arcuate section being at one point on said central axis so that said laser light beam radiates at the desired position of said reflecting face with the length of the optical path from said optical path deflecting means to said reference face being always uniform in spite of said variable radial directions.

2. An apparatus for deflecting a laser convergent light beam as set forth in claim 1, and wherein said optical path deflecting means comprises a rotary mirror having a plane reflecting face rotating while it is maintained at a predetermined angle relative to said reference face and having an axis of rotation identical with said central axis.

3. An apparatus for deflecting a laser convergent light beam as set forth in claim 1, and wherein said optical path deflecting means comprises a light beam deflecting element.

4. An apparatus for deflecting a laser convergent light beam as set forth in claim 1, and wherein there are provided slit-like non-reflecting portions on said reflecting face of said optical reflector means.

5. An apparatus for deflecting a laser convergent light beam as set forth in claim 1, and wherein there are provided grooves on said reflecting face of said optical reflector means.

6. An apparatus for deflecting a laser convergent light beam as set forth in claim 2, and wherein said optical path deflecting means comprises a plurality of laser light beam incident paths having a plurality of laser light beams reflected by said plane reflecting face of said rotary mirror at the angle of said optical path relative to said reference face and in the incident directions different from each other.

7. An apparatus for deflecting a laser convergent light beam as set forth in claim 1, wherein said optical path deflecting means includes a rotary device.

8. An apparatus for deflecting a laser convergent light beam as set forth in claim 1, wherein said optical path from said optical reflector means to said reference face is substantially perpendicular to said reference face.

9. The apparatus as set forth in claim 1, wherein said arcuate section of said optical reflector means lies in a conic section which is a circle having its center on said central axis of the cone.

10. An apparatus for deflecting a laser convergent light beam comprising:
    optical reflector means including a reflecting face;
    said reflecting face lying in a conical section circle of the surface of generation of a cone, having a predetermined acute angle relative to a reference face, and having said conical section circle parallel to said reference face; and
    optical path deflecting means to receive said laser light beam on a predetermined optical path and to irradiate said laser light beam onto said reflecting face in variable radial directions each having a predetermined angle relative to a central axis of the cone of said reflecting face with the center of said arcuate section being at one point on said central axis so that said laser light beam radiates at the desired position of said reflecting face with the length of the optical path from said optical path deflecting means to said reference face being always uniform in spite of said variable radial directions.

11. A method of deflecting a laser convergent light beam comprising the steps of:
    deflecting a laser light beam from a predetermined optical path in variable radial directions to a reflecting face on a portion of a cone, the reflecting face having a predetermined angle relative to a central axis of the cone, having a predetermined acute angle relative to a reference face, and having an arcuate section formed when viewed in a plane parallel to said reference face, with the center of the arcuate section at one point on the central axis of the cone; and
    reflecting said laser light beam off said reflecting face onto said reference face with the length of the optical path of deflected laser light beam to said reference face being always uniform in spite of said variable radial directions.

12. The method as set forth in claim 11, wherein said reflecting step reflects the laser light beam from said arcuate section which lies on a circle parallel to said reference face.

* * * * *

UNITED STATES PATENT AND TRADEMARK OFFICE
CERTIFICATE OF CORRECTION

PATENT NO. : 4,863,228

DATED : September 5, 1989

INVENTOR(S) : Tetsuji Aoyagi

It is certified that error appears in the above-identified patent and that said Letters Patent is hereby corrected as shown below:

Column 1, line 56, "radial variable" should be --variable radial--.

Column 1, last line, "radial" should be --variable--.

Column 2, first line, "variable" should be --radial--.

Column 3, line 44, "rotary variable" should be --variable rotary--.

Column 5, line 52, "deflecting variable" should be --variable deflecting--.

Column 6, line 11, "17," should be --$17_1$--.

Signed and Sealed this

Fourth Day of September, 1990

Attest:

HARRY F. MANBECK, JR.

Attesting Officer

Commissioner of Patents and Trademarks